July 25, 1967   D. F. DAW   3,332,282
HELICOPTER AIRSPEED INDICATOR
Filed Jan. 14, 1965   2 Sheets-Sheet 1

INVENTOR.
DONALD F. DAW
BY Westell & Hanley
PATENT AGENTS

United States Patent Office 3,332,282
Patented July 25, 1967

3,332,282
HELICOPTER AIRSPEED INDICATOR
Donald F. Daw, Ottawa, Ontario, Canada, assignor to Canadian Patents and Development Limited, Ottawa, Ontario, Canada, a corporation of Canada
Filed Jan. 14, 1965, Ser. No. 425,487
5 Claims. (Cl. 73—182)

ABSTRACT OF THE DISCLOSURE

A device for measuring the components of the horizontal airspeed of a helicopter by means of a pressure transducer on the rotor blade converting a cyclically varying pressure into an electrical signal which is transferred from the rotor to the frame of the aircraft through an inductive coupling using cored coils. By orienting the inductive transfer with respect to the axis of the aircraft any component of the translational speed may be determined and from component measurements the resultant translational speed may be derived.

The present invention relates to a device which will measure the indicated airspeed of a helicopter moving in any translational (horizontal) direction.

In fixed-wing aircraft it has been customary to use a pitot-static probe to measure airspeed. The operation of such a probe depends upon unidirectional flow of air relative to the force and aft axis of the aircraft. This is achieved by placing the probe outside the propeller or jet stream. For a helicopter, however, it is difficult if not impossible to locate the probe in a position on the frame where it will be free from disturbances in the air flow caused by the main rotor blade. The problem is accentuated where the airspeed of the helicopter is low, especially where the helicopter is flying in the speed range of 0 to 30 knots.

To be free from any disturbances in the air flow caused by the rotor blade it has previously been proposed to place the probe at the tip of the blade. As the blade rotates, the cyclic variation of the blade tip pressure per revolution is a function of the translational speed of the helicopter. By using a pressure transducer probe, this cyclic variation is converted into an electrical signal which is passed through the slip rings of the rotor and transposed to a visual indicator. Suitable computer means apply correctives such as blade lag resolution and r.p.m. compensation, as well as resolving the measured speed into its components along both the longitudinal and lateral axes of the helicopter.

It will be observed that slip rings are an essential component of this system. These are supplied only in large helicopters; light helicopters are not equipped with slip rings nor can they be installed easily or inexpensively.

The primary object of the present invention is to provide an airspeed indicator for use in a helicopter having no slip rings associated with the rotor shaft and frame of the aircraft. This object is achieved by employing an inductive coupling to transfer information in electrical form provided to that portion of the coupling on the rotor by a pressure sensor mounted on the rotor.

It is another object of the invention to provide a helicopter airspeed indicator having a simplified mode of construction. By properly orienting the coils of the inductive coupling it automatically resolves the electrical information into a function of the horizontal airspeed of the helicopter in a given direction. By providing for inductive transfer of such information at two angular positions relative to the force and aft axis, the longitudinal and lateral components of the horizontal airspeed of the helicopter may be determined, eliminating the need for a separate component resolver. From these component measurements the resultant airspeed and the angle of side slip of the helicopter may be derived, if desired.

Other objects and advantages of the invention will be apparent from a description of an example embodiment illustrated in the accompanying drawings in which.

Figure 1:
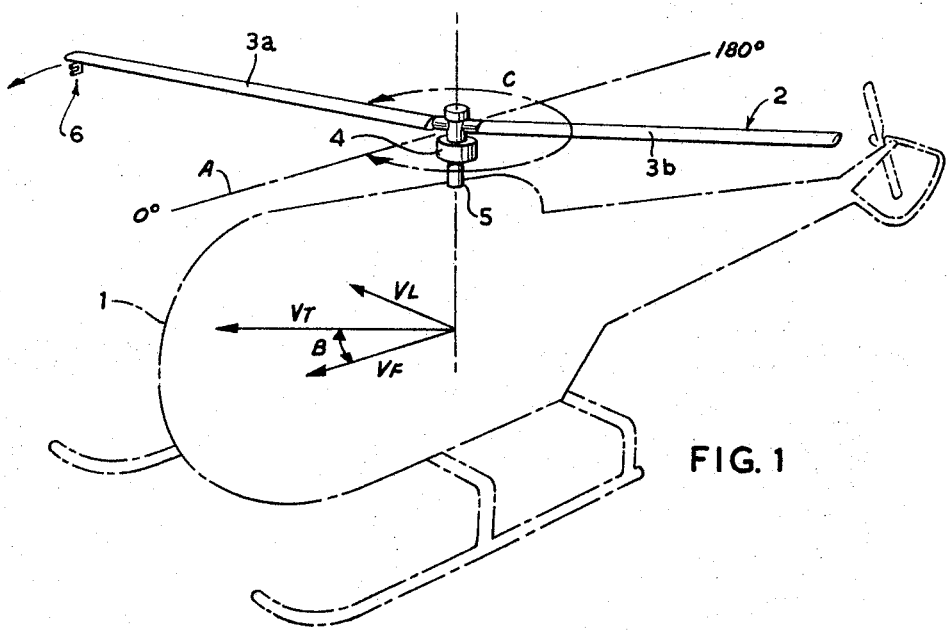
FIGURE 1 is a diagrammatic perspective view of a helicopter.
Figure 3:
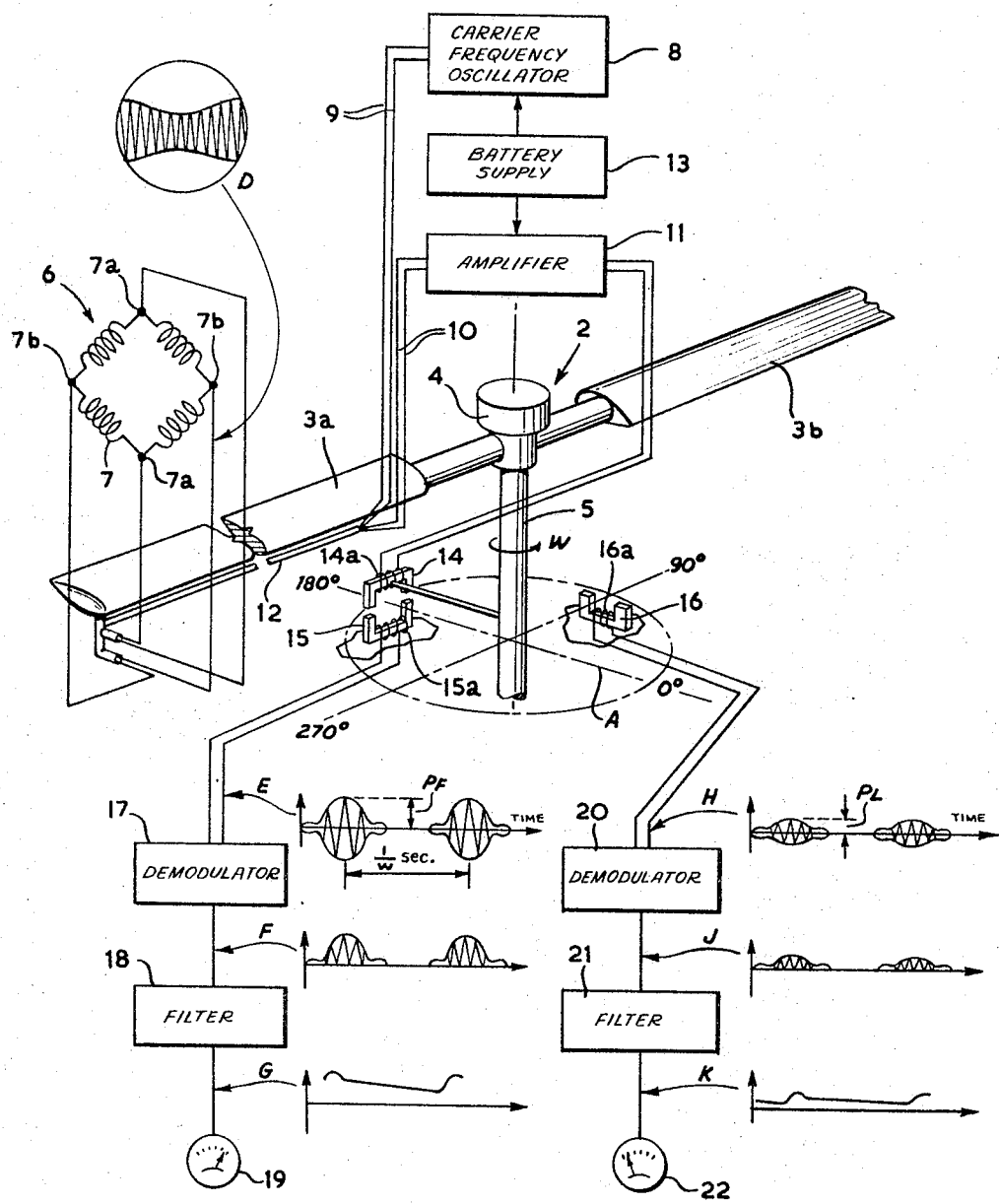
FIGURE 3 is a schematic diagram of the components and circuit of the invention.

FIGURE 1 of the drawings shows a typical helicopter body frame 1 having a rotor 2 which comprises a pair of diametrically opposed substantially horizontal blades 3a and 3b mounted on a common hub 4. A vertical shaft 5 carries hub 4 and is journalled to rotate in frame 1, suitably driven by a motor (not shown). The tip of blade 3a carries a suitable Pitot tube and a pressure sensor 6 facing in the direction of rotation of the blade. A similar Pitot tube and pressure sensor may be mounted at the tip of blade 3b but to simplify the description of the system only one probe and sensor is shown. Referring now to FIGURE 3, pressure sensor 6 consists of a four-leg electrical bridge formed by coils 7 of a variable resistance or a variable reluctance pick-off activated by a pressure sensitive diaphragm (not shown). Coils 7 are excited by an oscillator 8 mounted on hub 4 which supplies a carrier frequency to coils 7 through lines 9 to diametrically opposed input terminals 7a of the bridge. The output signal from diametrically opposed output terminals 7b of the bridge coils 7, amplitude modulated by the diaphragm (modulation envelope D), is returned by lines 10 to an amplifier 11 also mounted on hub 4. Lines 9 and 10 are preferably carried between the tip of blade 3 and hub 4 by a suitable cable 12 running inside the blade or bonded externally to the leading edge of the blade. Both oscillator 8 and amplifier 11 are supplied by a battery 13 also mounted on hub 4.

A core 14 of an inductive coupling or transformer, carrying a coil or winding 14a fed from the output of amplifier 11, is mounted radially on shaft 5 of rotor 2 adjacent frame 1. Core 14 is open with a pair of terminal faces approximately located in a plane perpendicular to the axis of rotation of shaft 5. A stationary core 15 carrying a coil or winding 15a is mounted on frame 1 adjacent rotor 2. Core 15 is open with a pair of terminal faces located and oriented to couple inductively with core 14 each time the rotor revolves through one revolution. Core 15 is located on frame 1 such that cores 14 and 15 are coupled when the rotor 2 is perpendicular to the longitudinal axes of frame 1. A second stationary core 16 carrying a coil or winding 16a is mounted on frame 1 adjacent rotor 2 and is also adapted to couple inductively with core 14 as the rotor revolves. Core 16 is located on the lateral axis at right angles to core 15.

Coil 15a is linked in series with a demodulator 17, a filter 18, and a potential measuring device having a visual (dial) indicator 19 respectively. Coil 16a is similarly linked in series with a demodulator 20, a filter 21 and a potential measuring device having a visual (dial) indicator 22 respectively.

When the helicopter is operating it will be appreciated that, as rotor 2 revolves, the total pressure on sensor 6 at the tip of blade 3a will be constant as long as the helicopter is not translating (moving in a horizontal direction relative to the air mass surrounding the helicopter). In other words, there will be a constant pressure which is a function of air density and the speed of rotation of rotor 2 and the length of blade 3a. However, when the helicopter translates there will occur a variation in pressure during each revolution which is cyclic at the rate of one cycle per revolution. This cyclic variation is sinusoidal at constant rotational speed. To obtain true air speed compensation must be applied for variations in static pressure and temperature.

Figure 2:
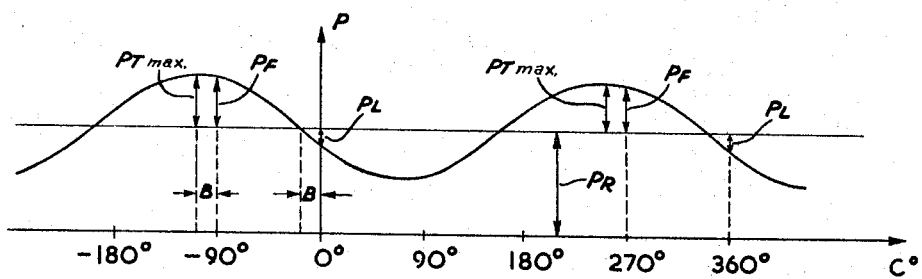
FIGURE 2 is a graphic representation of the total pressure variations at the rotor tip of the helicopter of FIGURE 1.

The specific example illustrated in FIGURES 1 and 2 shows a helicopter moving horizontally at a velocity $V_T$ at an angle B to its longitudinal axis. $V_T$ may be resolved into a longitudinal component $V_F$ and a lateral component $V_L$. As rotor 2 revolves at an angular velocity $\omega$ the constant pressure $P_R$ resulting therefrom, which is a function of $\omega$, will have superimposed on it the pressure $P_T$ which results from translation of the aircraft and is a function of $V_T$.

As mentioned above, translational pressure $P_T$ varies cyclically in its impingement on sensor 6, being maximum ($P_{Tmax}$) and minimum when blade 3a is at right angles to the direction of horizontal translation and zero when parallel thereto. Taking the longitudinal axis of the helicopter forward of rotor 2 as a datum line A, shown as 0° in FIGURE 1, the sinusoidal variation of $P_T$ on sensor 6 is shown graphically in FIGURE 2 for counterclockwise rotation of rotor 2. $P_{Tmax}$ occurs when blade 3a is at an angle of 270°—B from datum line A.

The total pressure acting on sensing unit 6 at any point in the rotation of rotor 2 may be expressed as follows:

$$P = P_R - P_{Tmax} \sin(B+C)$$

where $P$ = total pressure on the sensor at the blade tip
$P_R$ = average pressure during one rotation of the rotor blade
$P_{Tmax}$ = the maximum value of the pressure fluctuation resulting from the translational velocity $V_T$
$B$ = angle of translation with respect to the datum line, i.e. the side slip angle
$C$ = angle of counterclockwise rotation of the blade from the datum line at any given instant.

Neglecting compressibility effects the values of $P_R$ and $P_{Tmax}$ may be expressed as follows:

$$P_R = \tfrac{1}{2}\rho(r^2\omega^2 + V_T^2)$$
$$P_{Tmax} = \rho r \omega V_T$$

where $r$ = length of rotor blade from axis of rotation to sensor unit
$\omega$ = angular velocity of rotor blade
$\rho$ = density of surrounding air.

Translational pressure $P_T$ may also be resolved into longitudinal component $P_F$ and lateral component $P_L$, which are functions of $V_F$ and $V_L$ respectively and hence are a measure of longitudinal and lateral translation. Component $P_F$ is sensed (positively or negatively) by unit 6 when blade 3a is at right angles to datum line A (90 or 270°) while component $P_L$ is sensed (positively or negatively) when blade 3a is parallel to datum line A (0° or 180°). If cores 15 and 16 are suitably located on frame 1, a current can be induced into windings 15a and 16a equal to the magnitude of the pressures $P_F$ and $P_L$ respectively. To accomplish this result core 15 is positioned at 180° and core 16 is positioned at 90° with respect to datum line A, as mentioned above, with core 14 being positioned 180° to datum line A when blades 3a and 3b are located at 270° and 90° respectively (i.e. transverse to the axis of the blades—see FIGURE 3).

In the operation of the device oscillator 8 supplies a fixed carrier frequency, say 4000 cycles per second, across the bridge formed by coils 7 of pressure sensing unit 6 to excite the unit. Rotor 2 rotates at a much lower frequency, say 6 revolutions per second. As mentioned above, the total pressure on sensing unit 6 will be constant while the helicopter is hovering or moving in a vertical direction. However, when the helicopter moves in a horizontal direction (translate) there will be a cyclic variation in pressure during each revolution. This cyclic variation amplitude modulates the carrier frequency supplied to sensing unit 6 to produce an amplitude modulated output signal. The output signal envelope is passed through amplifier 11 and in passing through coil 14a produces a cyclical varying flux amplitude in core 14.

As core 14 passes core 15 in the rotation of rotor 2, the two cores supply a highly permeable path for the flux generated by coil 14a (with the two air gaps between the core ends) and inductive coupling takes place between coils 14a and 15a. Thus an alternating current pulse E, corresponding to each rotation of rotor 2, is produced in coil 15a corresponding to the magnitude of modulation envelope D at the time of inductive coupling and hence corresponding to the pressure on sensor 6 at the time of coupling. Such pulses are rectified by demodulator 17 to produce a signal F and smoothed by filter 18 to produce a signal G which is adapted to produce on indicator 19 a reading proportional to the pressure on sensor 6 and hence to the forward airspeed ($V_F$) of the helicopter at the time of coupling.

Similarly, as core 14 passes core 16 in the rotation of rotor 2 inductive coupling takes place between coils 14a and 16a. An alternating current pulse H is produced in coil 16a which is rectified by demodulator 20 to produce a signal J and smoothed by filter 21 to produce a signal K. A reading is produced on indicator 22, by signal K, proportional to the pressure on sensor 6 and hence to the lateral airspeed of the helicopter ($V_L$) at the time of coupling between coils 14a and 16a.

As mentioned above, the true airspeed of the helicopter may be determined by correcting $V_F$ and $V_L$ for the static pressure and temperature of the air.

Side slip angle B may be obtained by computing the following equation:

$$B = \arctan \frac{V_L}{V_F}$$

The sensitivity of the described embodiment may be enhanced by the addition of a second Pitot tube and pressure sensor unit at the tip of blade 3b of rotor 2, a second amplifier mounted on hub 4, and a second cored coil mounted on shaft 5 diametrically opposite cored coil 14a, all interconnected so that the second cored coil is energized by the amplified signal from the second sensor unit. A cored coil mounted on frame 1 diametrically opposite cored coil 15a (with respect to shaft 5) would be connected in series opposition to coil 15a and the resulting signal applied to demodulator 17. Similarly a cored coil mounted on frame 1 diametrically opposite cored coil 16a would be connected in series opposition to coil 16a and the resulting signal applied to demodulator 20.

The aforementioned additions provide twice as many pulses per rotation of the rotor, consequently less filtering is required at the output of the demodulators. Also by subtracting the signals from the two sensor units, as is accomplished by connecting the pairs of coils fixed to frame 1 in series opposition, the airspeed system becomes insensitive to zero drifting of the components.

I claim:

1. A device for measuring a component of the horizontal airspeed of a helicopter, comprising: a first cored coil mounted on the rotor of the helicopter; at least one stationary second cored coil mounted on the frame of the helicopter and positioned to couple inductively with said first coil periodically on rotation of the rotor; means for supplying to said first coil a signal of a strength characteristic of the pressure reactive to the movement of the rotor relative to the air at a point spaced outwardly from its axis of rotation; and means to indicate the signal induced in said second coil, said indicator means comprising in sequence a demodulator, a filter, and a potential measuring device.

2. In a helicopter, a pressure transducer mounted on one blade of the rotor of the helicopter and being tangential to the circular path of movement thereof, means to provide a carrier singal to said pressure transducer, a cored coil mounted on said rotor at a location spaced radially from the axis of rotation thereof and connected to said pressure transducer, first and second spaced cored coils mounted on the frame of the helicopter adjacent the path of said rotor coil and positioned to couple inductively with the rotor coil in sequence once per revolution of the rotor, and means to indicate the signal induced in said first and second frame coils, said indicator means comprising in sequence a demodulator, a filter, and a potential measuring device.

3. A device as claimed in claim 2 wherein said first and second frame coils are spaced 90° one from another in the longitudinal and lateral axes of the frame passing through the axis of rotation of the rotor, and said rotor coil is spaced from the axis of rotation of the rotor in a line transverse to the axis of said one blade.

4. A device as claimed in claim 2 wherein the pressure transducer is mounted at the tip of said blade.

5. A device for measuring the longitudinal and lateral components of the horizontal airspeed of a helicopter, comprising a pressure transducer mounted tangentially on the tip of one blade of the rotor of the helicopter, an oscillator mounted on the rotor and connected with the pressure transducer to provide a carrier frequency therefor, an amplifier mounted on the rotor and connected with the pressure transducer to amplify the amplitude modulated frequency envelope received therefrom, a cored coil mounted on the rotor adjacent the frame of the helicopter and spaced radially from the axis of rotation of the rotor in a line transverse to the axis of said one blade, a first cored coil mounted on the frame of the helicopter in the longitudinal axis thereof, a second cored coil mounted on the frame of the helicopter in the lateral axis thereof, said first and second frame coils being positioned to couple inductively with said rotor coil in sequence once per revolution of the rotor, a demodulator and filter and visual indicator connected in series with said first frame coil, and a demodulator and filter and visual indicator connected in series with said second frame coil.

References Cited
UNITED STATES PATENTS

| | | | |
|---|---|---|---|
| 2,524,747 | 10/1950 | Ayres et al. | 73—182 |
| 2,575,922 | 11/1951 | Langenwalter | 73—351 |
| 2,986,933 | 6/1961 | Summerlin et al. | 73—181 |
| 3,070,999 | 1/1963 | Garbell | 73—181 |

OTHER REFERENCES

NBS Technical News Bulletin, "Turbine Blade Temperature Telemeter," December 1954.

LOUIS R. PRINCE, *Primary Examiner.*

N. B. SIEGEL, *Assistant Examiner.*